(12) United States Patent
Wallace et al.

(10) Patent No.: US 7,024,166 B2
(45) Date of Patent: Apr. 4, 2006

(54) TRANSMISSION DIVERSITY SYSTEMS

(75) Inventors: Mark S. Wallace, Bedford, MA (US); Stein A. Lundby, Solana Beach, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 594 days.

(21) Appl. No.: 10/323,249

(22) Filed: Dec. 18, 2002

(65) Prior Publication Data

US 2004/0121809 A1  Jun. 24, 2004

(51) Int. Cl.
*H03C 7/02* (2006.01)
*H04B 1/02* (2006.01)
*H04B 7/02* (2006.01)

(52) U.S. Cl. .................... 455/101; 455/562.1; 375/299
(58) Field of Classification Search ................ 455/101, 455/91, 562.1; 375/267, 299, 146, 260
See application file for complete search history.

(56) References Cited

U.S. PATENT DOCUMENTS

| 6,539,209 B1 * | 3/2003 | Dajer et al. .................. 455/101 |
| 6,724,842 B1 * | 4/2004 | Hochwald et al. .......... 375/347 |
| 6,862,434 B1 * | 3/2005 | Wallace et al. ............. 455/101 |
| 6,865,237 B1 * | 3/2005 | Boariu et al. ................ 375/295 |
| 2003/0068994 A1 * | 4/2003 | Sayeed et al. .............. 455/295 |
| 2004/0032910 A1 * | 2/2004 | Horng et al. ................ 375/267 |
| 2005/0020215 A1 * | 1/2005 | Hottinen ...................... 455/101 |

* cited by examiner

*Primary Examiner*—Nick Corsaro
*Assistant Examiner*—Lewis West
(74) *Attorney, Agent, or Firm*—Philip R. Wadsworth; Thien T. Nguyen; Kyong H. Macek

(57) ABSTRACT

A time-varying transformation is used to correlate the magnitude of the interference between multiple antenna paths. Embodiments incorporating the time-varying transformations provide transmit diversity gains to remote stations that are not configured for transmit diversity reception. In addition, some of the embodiments can be further configured to balance the load between multiple power amplifiers.

12 Claims, 5 Drawing Sheets

TRANSMISSION DIVERSITY SYSTEMS

BACKGROUND

1. Field

The present invention relates generally to wireless communications, and more specifically, to transmission diversity systems.

2. Background

The field of wireless communications has many applications including, e.g., cordless telephones, paging, wireless local loops, personal digital assistants (PDAs), Internet telephony, and satellite communication systems. A particularly important application is cellular telephone systems for remote subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in $3^{rd}$ *Generation Partnership Project "3GPP"*, Document Nos. 3G TS 25.211, 3G TS 25.212, 3G TS 25.213, and 3G TS 25.214.

The telecommunication standards cited above are examples of only some of the various communications systems that can be implemented. Most of these systems are now configured to use a single antenna for forward link transmissions to a single remote station, but it is envisioned that multiple antennas will eventually be used for forward link transmissions to a single remote station. Multiple antennas provide transmit diversity (TD), which increases the quality of the forward link. When the quality of the forward link improves, less transmission power is required to convey information to a remote station. Conversely, more information can be conveyed using the same transmission power, and the overall data throughput of the link is increased. As used herein, the term "forward link" refers to transmissions from a base station to a remote station while the term "reverse link" refers to transmissions from a remote station to a base station.

In transmission diversity systems, antenna phase information and amplitude information are acquired by a remote station through a pilot channel transmitted from each antenna. One of the antennas is considered to be the primary antenna, whereas the other antennas are considered to be the auxiliary antennas. For illustrative ease only, the embodiments that follow will be described as two-antenna systems. The number of antennas can be extended without affecting the scope of the embodiments described herein.

A problem arises with the deployment of systems offering transmission diversity. Namely, while a communication system may be upgraded to utilize multiple antennas, the remote stations operated by individual users may not keep pace with the system upgrades. The current state of the art envisions a system that can support a non-TD remote station by using the primary antenna alone. Since almost all wireless communication systems require the transmission of characterizing information from the remote station to a serving base station, a TD base station can easily be notified that transmissions to a non-TD remote station should be sent only on the primary antenna. The modulation at the base station can then be altered accordingly.

However, the current method of transmitting only on the primary antenna to a non-TD remote station is flawed. The flaw arises from the deleterious effects of interference between antenna transmission paths when both a non-TD remote station and a TD remote station are operating in a system with transmission diversity. In spread spectrum communication systems, such as, e.g., CDMA and W-CDMA, orthogonal and quasi-orthogonal codes, such as the Walsh code sequences, are used to channelize the information sent to each remote station on the forward link. In other words, Walsh code sequences are used on the forward link to allow the system to overlay multiple users, each assigned a different orthogonal or quasi-orthogonal code, on the same frequency during the same time duration.

Hence, the signals originating from one antenna transmission are orthogonal and the magnitude of the interference between these orthogonal signals is correlated. However, even though the signals originating from multiple antennas may be orthogonal, the transmission medium will introduce imperfections such as multi-path, which will degrade the orthogonality between signals. Signals received by the remote stations will not be entirely orthogonal and will thereby interfere with each other. The magnitude of the interference between one antenna transmission path and another antenna transmission path is generally not correlated, since the signals from the different antennas propagate along different wireless paths. If the magnitude of the interference between the various antenna paths is not correlated, then the transmission gains arising from combining multipaths are no longer present for non-TD remote stations. A more detailed explanation of this phenomenon is presented below.

Since a base station with transmission diversity will be transmitting to both TD remote stations and non-TD remote stations during the same time duration and on the same frequencies, it follows that the performance of a non-TD remote station suffers greatly when operating amidst TD remote stations. Therefore, there is a need in the art for methods and apparatus that allow a non-TD remote station to operate within a transmission diversity system in a manner that does not impair the quality of the received forward link transmissions.

Besides the aforementioned problem suffered by non-TD remote stations within a TD system, another situation occurs that reduces the effectiveness of the TD system. In certain situations, available transmission capacity may be left unused due to a system inability to balance the power between multiple antennas. When the power load on the multiple antennas is unevenly distributed or when the power ratings on the power amplifiers for each antenna are different, current systems are not configured to redistribute the transmission load from one overburdened antenna to another under-utilized antenna.

Typically, each antenna has its own separate power amplifier. Power amplifiers are rated for a maximum power, based on design constraints and regulatory constraints. There is therefore a limit to the amount of power with which each antenna can transmit. In current systems, the system is designed to be limited whenever one of the power amplifiers reaches its maximum load, even if another power amplifier has capacity available. In other words, available power from an under-utilized antenna cannot be redistributed to a heavily loaded antenna. This problem may occur when multiple antennas are not loaded with the same transmission load, or when different power amplifiers have different power ratings.

There are certain situations wherein the multiple antennas are not loaded with the same transmission power. One situation is the case where there are transmissions to both non-TD and TD remote stations, such that transmissions to non-TD remote stations occur only on the primary antenna and transmissions to TD remote stations occur on both primary and auxiliary antennas. It is impossible to predetermine the required power ratings of the primary and auxiliary power amplifiers on a base station supporting TD, since power depends on a fluctuating number of TD and non-TD remote stations that are serviced by the base station at any given time. The base station throughput capacity is therefore likely to be limited by the power amplifier of a fully loaded, primary antenna, since the power from the other power amplifiers cannot be "borrowed." Note that the power from the other power amplifiers cannot be utilized because of legal constraints imposed by the various standards bodies, and not because of a physical constraint.

Another situation in which the power amplifiers have uneven loads may occur during the transmission of certain channels. For example, the paging channels and synchronization channels of cdma2000 are configured for transmission only on the primary antenna, which affects the load on the primary power amplifier. The increased load makes it more likely that the power amplifier for the primary antenna will reach full capacity before the power amplifiers for the auxiliary antennas, so that the power amplifiers on the auxiliary antennas will have available power that is left unused. This translates into wasted capacity. Therefore, there is also a need in the art for methods and apparatus that will increase the forward link capacity of TD systems by utilizing the "wasted capacity" of the auxiliary antennas that is caused by full loading on the primary antenna.

SUMMARY

Methods and apparatus are presented herein to address the above stated needs. In one aspect, an apparatus is presented for providing transmission diversity gains to a non-transmission diversity receiver, the apparatus comprising: a primary antenna; at least one auxiliary antenna; and a redistribution unit configured to receive a combined non-transmit diversity and first transmit diversity signal, to receive a second transmit diversity signal, to generate a time-varying version of the combined non-transmit diversity and first transmit diversity signal, to generate a time-varying version of the second transmit diversity signal, and to redistribute the time-varying versions over the primary antenna and the at least one auxiliary antenna.

In another aspect, a redistribution unit is presented for processing a primary transmission signal and an auxiliary transmission signal within a transmission diversity system to provide transmission diversity gains to non-transmission diversity receivers, the redistribution unit comprising: a distribution path for the primary transmission signal toward a primary antenna; a first time-varying element for generating a time-varying copy of the primary transmission signal and redistributing the time-varying copy of the primary transmission signal to an auxiliary antenna; and a second time-varying element for generating a time-varying copy of the auxiliary transmission signal and for redistributing the time-varying copy of the auxiliary transmission signal to the auxiliary antenna, wherein the auxiliary transmission signal is not distributed to the auxiliary antenna.

In another aspect, a method is presented for providing transmission diversity gains to non-transmission diversity receivers in a transmission diversity system, wherein the transmission diversity provided using a primary antenna and an auxiliary antenna, the method comprising: generating a time-varying version of a combined non-transmit diversity and first transmit diversity signal; generating a time-varying version of a second transmit diversity signal; directing the combined non-transmit diversity and first transmit diversity signal toward the primary antenna; directing the time-varying version of combined non-transmit diversity and first transmit diversity signal toward the auxiliary antenna; and directing the time-varying version of the second transmit diversity signal toward the auxiliary antenna instead of the second transmit diversity signal.

In another aspect, an apparatus is presented for balancing the transmission power of multiple antennas in a transmission diversity system, the apparatus comprising: a distribution path for a primary transmission signal toward a primary antenna; a distribution path for a first auxiliary transmission signal toward an auxiliary antenna; a first time-varying element for generating a time-varying copy of the primary transmission signal and redistributing the time-varying copy of the primary transmission signal towards the auxiliary antenna; and a second time-varying element for generating a time-varying copy of a second auxiliary transmission signal and for redistributing the time-varying copy of the second auxiliary transmission signal toward the auxiliary antenna, wherein the second auxiliary transmission signal is not distributed to the auxiliary antenna.

In one aspect, an apparatus is presented for conveying power-balanced transmission signals of a transmission diversity system, the apparatus comprising: a primary antenna; an auxiliary antenna; and a redistribution unit configured to receive a non-transmit diversity signal directed to the primary antenna, a first transmit diversity signal directed to the primary antenna, and a second transmit diversity signal directed to the auxiliary antenna, wherein the redistribution unit is further configured to generate a time-varying version of the non-transmit diversity signal and a time-varying version of the second transmit diversity signal and to redistribute the time-varying version of the non-transmit diversity signal to the auxiliary antenna and the time-varying version of the second transmit diversity signal to the auxiliary antenna instead of the second transmit diversity signal.

In one aspect, a method is presented for balancing transmission loads of antennas in a transmit diversity environment, the method comprising: directing the non-transmit diversity and a first transmit diversity signal toward a primary antenna; generating a time-varying version of a non-transmit diversity signal; generating a time-varying version of a second transmit diversity signal; directing the time-varying version of the non-transmit diversity signal to an auxiliary antenna; and directing the time-varying version of the second transmit diversity signal toward the auxiliary antenna instead of the second transmit diversity signal.

In one aspect, an apparatus is presented for balancing transmission loads of multiple antennas, the apparatus comprising: means for directing the non-transmit diversity signal and a first transmit diversity signal toward a primary antenna; means for generating a time-varying version of a non-transmit diversity signal; means for generating a time-varying version of a second transmit diversity signal; means for directing the time-varying version of the non-transmit diversity signal to an auxiliary antenna; and means for directing the time-varying version of the second transmit diversity signal toward the auxiliary antenna instead of the second transmit diversity signal.

DETAILED DESCRIPTION

Figure 1:
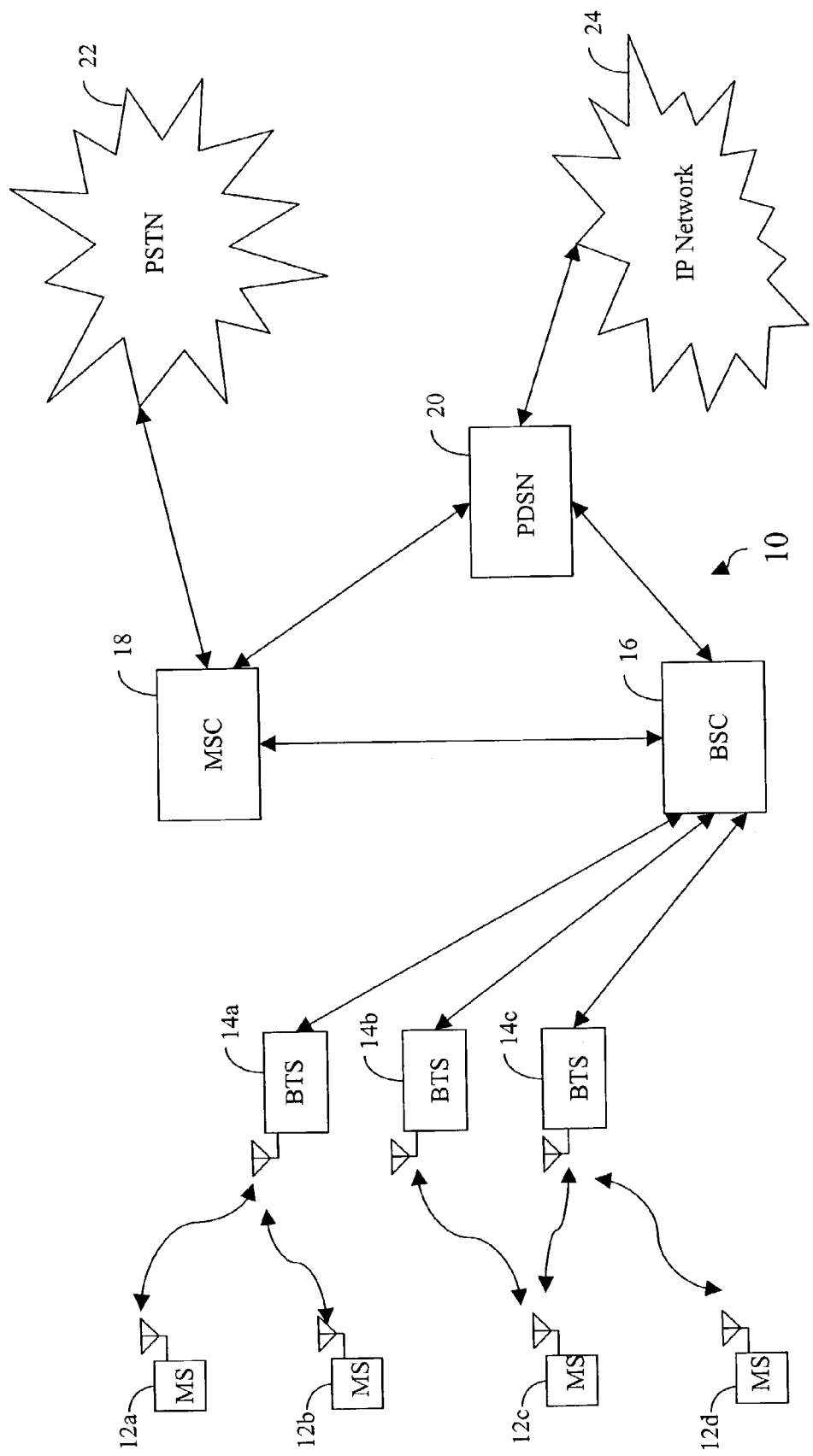
FIG. 1 is a diagram of a wireless communication network.

As illustrated in FIG. 1, a wireless communication network 10 generally includes a plurality of remote stations (also called subscriber units or mobile stations or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four remote stations 12a–12d, three base stations 14a–14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment the wireless communication network 10 is a packet data services network. The remote stations 12a–12d may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as might be found in a wireless local loop or meter reading system. In the most general embodiment, remote stations may be any type of communication unit.

The remote stations 12a–12d may advantageously be configured to perform one or more wireless packet data protocols such as described in, for example, the EIA/TIA/IS-707 standard. In a particular embodiment, the remote stations 12a–12d generate IP packets destined for the IP network 24 and encapsulates the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of uplink signals from various remote stations 12a–12d engaged in telephone calls, Web browsing, or other data communications. Each uplink signal received by a given base station 14a–14c is processed within that base station 14a–14c. Each base station 14a–14c may communicate with a plurality of remote stations 12a–12d by modulating and transmitting sets of downlink signals to the remote stations 12a–12d. For example, as shown in FIG. 1, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a–12d from one base station 14a–14c to another base station 14a–14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In a WCDMA system, the terminology of the wireless communication system components differs, but the functionality is the same. For example, a base station can also be referred to as a Radio Network Controller (RNC) operating in a UMTS Terrestrial Radio Access Network (U-TRAN), wherein "UMTS" is an acronym for Universal Mobile Telecommunications Systems.

The transmitted signals in communication systems are inherently prone to degradations such as channel noise and interference. Depending on the level of channel noise and interference, the transmitted data may or may not be recoverable at the receiver. Various Error Control Coding (ECC) techniques exist for increasing the overall robustness of the communication system to noise and interference from the channel. The basic idea behind such techniques is to introduce redundant information in the stream of transmitted data. If errors were to occur in the reception of the transmitted signal, the data may still be recovered by exploiting this redundancy.

An example of an ECC technique is convolutional coding. In convolutional coding, binary data bits are input to a finite state machine (FSM), which produces one or more binary outputs for every input data bit. The outputs of this FSM are called code symbols. A typical method for constructing such an FSM is through one or more convolutional encoders, i.e., finite impulse response (FIR) binary digital filters operating using arithmetic in the Galois Field GF(2). If the code symbols are corrupted by noise and interference during transmission over a noisy channel, the data bits may still be recoverable through suitable inferences based upon the corrupted code symbols. Inferences are possible because the code symbols are "redundant", i.e., the code symbols contain information about not only the input data bits but also the "internal state" of the FSM. Methods for optimally inferring the input data bits from the received code symbols are known in the art and are commonly referred to as Trellis Decoding Algorithms, e.g., the Viterbi Algorithm, or the Stack Algorithm.

Another example of an ECC technique is turbo coding. Turbo coding employs two or more convolutional encoders in parallel, in series, or in a combination thereof. The resulting sequence of code symbols also possesses redundant information about the input data bits. Furthermore, methods for optimally inferring the input data bits from the received code symbols are known in the art and are commonly referred to as turbo decoding algorithms.

In a typical communication system, a "source" generates a stream of information bits representing, for example, voice or data "traffic". This stream of bits is subdivided and grouped, various control bits are appended, and the result is packed into a suitable format for transmission. Voice and data traffic can be transmitted in various formats, such as, e.g. frames, packets, and subpackets. The scope of the embodiments described herein extends to all wireless communication systems using any of the various transmission formats. However, for the purpose of illustrative ease, the term "frame" will be used herein to describe the transmission format in which traffic is carried.

In a typical CDMA spread spectrum communication system, frames comprising bits are convolutionally or turbo encoded, repeated, and punctured to produce a sequence of binary code symbols. The resulting code symbols are interleaved to obtain a frame of modulation symbols. The output of the interleaver is referred to herein as modulation symbols. The modulation symbols are then Walsh covered and combined with a pilot sequence on the orthogonal-phase branch, PN-spread, baseband filtered, and modulated onto the transmit carrier signal.

The signal propagates to the receiver over multiple transmission paths and is received as a superposition of multiple components, each with its own amplitude, phase and time delay. These multiple transmission paths are referred to as "multipaths" and are commonly caused by reflections off objects present in the transmission path. At the receiver, the signal is match-filtered, sampled, digitized and down-converted to complex baseband before it is fed to a searcher and a RAKE processor. The searcher usually determines the time delays of the multipath components in the received signal. The RAKE processor comprises multiple "fingers", each of which is synchronized to the time delay of a particular multipath component. Each RAKE finger is configured to PN-despread the sampled and digitized waveform using the PN code synchronized to that finger's particular time delay. Additionally, each RAKE finger is able to perform Walsh de-covering to separate the modulation symbols from the orthogonal pilot symbols.

The received modulation and pilot symbols are complex vectors of length L, where L is the number of fingers in the RAKE processor. When L RAKE fingers are assigned to L different multipath components in the received signal, the situation is sometimes called multipath diversity.

When the same modulation symbols are transmitted on different frequency bands or on different carriers, RAKE fingers are assigned to different multipath components on different carriers. This method is called frequency or carrier diversity.

When the same modulation symbols are repeated or retransmitted in future frames or time slots, RAKE fingers are assigned to different multipath components on the different time slots. This is sometimes known as time diversity.

When multiple, spatially separated antennas are used for transmission, RAKE fingers are assigned to different multipath components received from different antennas. This method is commonly known as transmit, spatial, or antenna diversity. For example, if $L_1$ RAKE fingers are assigned to multipath components on a first antenna, and $L_2$ RAKE fingers are assigned to multipath components on a second antenna, then $L=L_1+L_2$. Alternatively, specialized RAKE fingers may be designed to simultaneously receive one multi-path component from each antenna. With transmission diversity, more modulation symbols can be transmitted to a receiver, which increase the data throughput of the system. In addition, transmission diversity increases the robustness of the communications system to noise and interference by providing alternative signal paths. For example, if a transmission from one antenna to a remote station fails due to a physical blockage, i.e., a tree, or due to closely spaced multi-paths combining destructively, it is likely that a transmission from another antenna may reach the remote station instead. Hence, transmission diversity increases the reliability of the connection, which on average, requires less transmission power.

In the cdma2000 standard, two types of transmission diversity systems are offered. The first type of transmission diversity system is referred to as an Orthogonal Transmit Diversity (OTD) system, wherein the evenly-numbered modulation symbols are transmitted on a first antenna and the odd-numbered modulation symbols are transmitted on a second antenna. Hence, half of the modulation symbols are sent on each antenna. The transmissions from the antennas are separated by the use of different Walsh codes for each antenna.

The second type of transmit diversity system is referred to as a Space-Time Spreading (STS) system. In an STS system, all modulation symbols are sent on all antennas. The transmissions from the antennas are modulated using an "Alamouti" matrix, which allows the separation and combining of two modulation symbols at a time by a remote station. In an Alamouti system, two different symbols are simultaneously transmitted from two antennas and the complex conjugate of the other symbol is then transmitted within one symbol period. For example, a symbol $s_0$ is transmitted through a first antenna while a second symbol $s_1$ is concurrently transmitted through a second antenna. Within one symbol period, the complex conjugate of the second signal $s_1^*$ is transmitted through the first antenna while the complex conjugate of the signal $s_0^*$ is concurrently transmitted through the second antenna. In other words, the first antenna transmits $\{s_0, s_1^*\}$ while the second antenna transmits $\{s_1, s_0^*\}$. At the receive end, a combiner builds two combined symbols $s_0'$ and $s_1'$ using a matrix H, which models the channel response for each antenna transmission path. The combined symbols are then used in a maximum likelihood decision rule to reach a decision as to the value of a received symbol.

A problem arises for non-TD remote stations that operate within systems that are configured for transmission diversity. In a system with transmission diversity, the signals within a path are orthogonal and the interference between the orthogonal signals is correlated with the magnitude of the signal. However, even though the signals over multiple antenna paths may be orthogonal, the interference between one antenna transmission path and another antenna transmission path is not necessarily correlated. If the magnitude of the interference between the various antenna paths is not correlated, then the transmission gains arising from combining multipaths are no longer present.

As an example of this correlation phenomena, suppose that a non-TD system with a single antenna transmits to a receiver, and the received signal is subject to self-interference due to multi-path or some other loss of orthogonality. Suppose that the fraction of self-interference is 10% of the signal. Neglecting the background noise, the receiver sees a signal with a signal strength of $A_1$ and noise that is 10% of $A_1$. Then the signal to noise ratio (SNR) is:

$$\frac{S}{N} = \frac{A_1}{0.10 A_1} = 10.$$

The signal and the noise are correlated in the above example, e.g., if the noise increases then the signal increases as well, so that the SNR stays constant. Now suppose instead that a TD system with two antennas uses one of the antennas to transmit to a receiver, and the received signal is also subject to 10% of self-interference. The receiver sees a signal with a signal strength $A_1$ and noise that is 10% of $(A_1+A_2)$, wherein $A_2$ is the signal strength of the second antenna transmitting to another receiver. Then the SNR is:

$$\frac{S}{N} = \frac{A_1}{0.10(A_1 + A_2)} = 10 \frac{A_1}{(A_1 + A_2)}.$$

The signal and the noise are not correlated due to the influence of $A_2$. An increase in the noise power does not necessarily coincide with an increase in the signal power.

Figure 2:
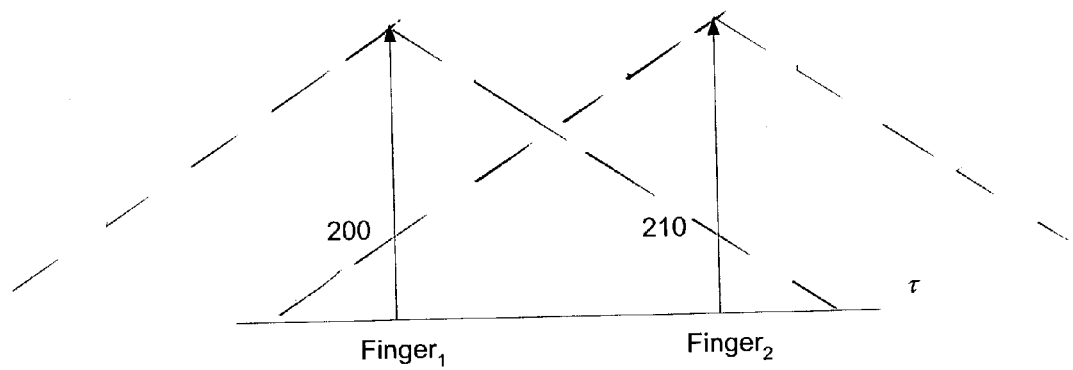
FIG. 2 shows non-transmit diversity signals detected at RAKE receiver fingers.
Figure 3:
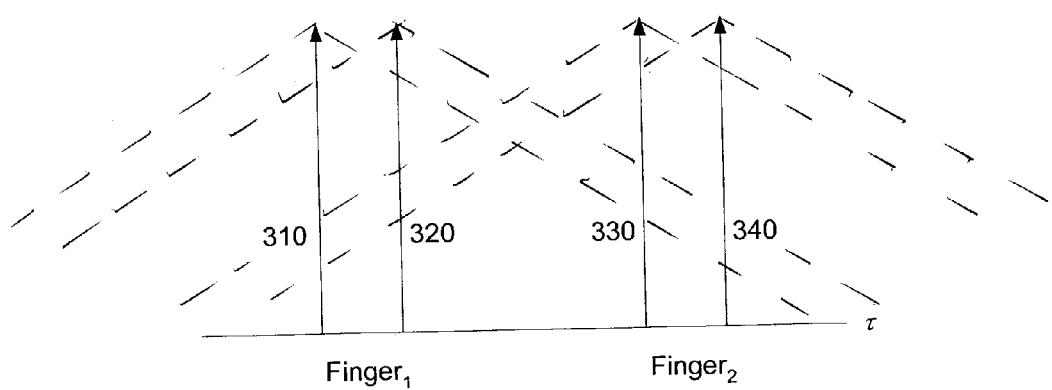
FIG. 3 shows transmit diversity signals detected at RAKE receiver fingers.

FIG. 2 and FIG. 3 illustrate the above-described phenomenon. In FIG. 2, a RAKE processor assigns Finger$_1$ (not shown) to a first multipath signal 200 received at a first time offset of a scrambling code and Finger$_2$ (not shown) to a second multipath signal 210 received at a second time offset of the scrambling code. The first multipath signal 200 directly interferes with the second multipath signal 210 as noise (shown as dashed lines on figures), and the second multipath signal 210 directly interferes with the first multipath signal 200 as noise. Hence, if the amplitude of the first multipath signal 200 decreases, then for the second multipath signal 210, the noise component of the signal to noise ratio (SNR) decreases. Thus, if the SNR of Finger$_1$ decreases then the SNR of Finger$_2$ increases. There is a natural balancing effect. This phenomenon is one of the benefits of using a multipath receiver in a spread spectrum communication system.

However, in a system with transmission diversity, this phenomenon disappears if a remote station cannot receive its signal from both antennas, such as the case with non-TD remote stations. In FIG. 3, a RAKE processor assigns Finger$_1$ to a first multipath signal 310 from a first antenna and a second multipath signal 320 from second antenna. The RAKE processor assigns Finger$_2$ to a third multipath signal 330 from the first antenna and a fourth multipath signal 340 from the second antenna. The magnitude of the interference between the first antenna and the second antenna is not correlated. Hence, if the first multipath signal 310 decreases in amplitude, then the amplitude of the second multipath signal 320 may remain the same. If the amplitude of the second multipath signal 320 remains the same, then the SNR of the third multipath signal 330 and the fourth multipath signal 340 will not fully benefit from the decreased interference from the first multipath signal 310. The second multipath signal 320 still interferes with the reception on Finger$_2$.

For a non-TD station that is operating in a transmission diversity system, the receiver fingers would capture, as an example, the first multipath signal 310 and the third multipath signal 330, but these signals would still be affected by the interference of the second multipath signal 320 and the fourth multipath signal 340. Hence, the gain arising from using multipath receivers is not realized for non-TD stations.

It should be noted again that the current state of the art envisions the support of non-TD remote station in transmission diversity systems by using only a primary antenna to transmit signals to the non-TD remote station, so that the non-TD remote station will receive modulation symbols that can be decoded by the non-TD remote station. However, due to the nature of spread spectrum communications, the TD base station is also transmitting to TD remote stations on both the primary and the auxiliary antennas. Hence, the non-TD remote station will receive interference from the auxiliary antennas, the magnitude of which is uncorrelated with the non-TD signal.

The embodiments that are described herein are for a transmission diversity system that supports both non-TD and TD remote stations while providing the gains associated with transmission diversity to non-TD remote stations.

In addition to providing diversity gains to non-TD remote stations, the embodiments will also provide a mechanism for balancing the load between multiple power amplifiers, which are each communicatively coupled to the multiple transmission antennas. Furthermore, the embodiments will also provide a mechanism that will allow any traffic channel to utilize all the available power of the power amplifiers.

In order to achieve the above-stated goals, TD and non-TD transmission signals are transmitted over multiple antennas in a manner that correlates the interference between the multiple antenna transmission paths. As used herein, transmission signals directed to non-TD remote stations are referred to as $X_N$ and transmission signals directed to TD remote stations are referred to as $X_{TD}$. The embodiments encompass the use of an apparatus that performs a time-varying transformation of transmission diversity signals and non-transmission diversity signals that are then mapped to multiple antenna paths. Note that the term "transmission signals" is used rather than the term "modulation symbols" to denote the signal that is directed over the antennas, since different modulation symbols associated with one or several channels may be combined for transmission.

A time-varying transformation is implemented to provide good coverage to non-TD stations over portions of the interleaved modulation symbols within the transmission signal. In other words, within a frame of modulation symbols received by a remote station, there will occur corrupted bits and uncorrupted bits. However, due to the time-varying interaction between the multiple antennas, the uncorrupted bits will arrive in good enough condition so that the receiver can effectively use the error control coding techniques described previously. Moreover, the time-varying transformation of the transmission signals will correlate the interference between the antenna paths.

For example, if $A_1 >> A_2$ at a given time-instant, i.e., transmissions occur mostly on the primary antenna, then the fingers of the non-TD receiver will lock on to the signals from antenna $A_1$, with SNR as follows:

$$\frac{S}{N} = 10\frac{A_1}{(A_1 + A_2)} \approx 10\frac{A_1}{A_1} \approx 10.$$

But if at a different time-instant the time-varying transformation is such that $A_1 << A_2$, the fingers of the non-TD receiver will lock on to the signals from antenna $A_2$, with SNR as follows:

$$\frac{S}{N} = 10\frac{A_2}{(A_1 + A_2)} \approx 10\frac{A_2}{A_2} \approx 10.$$

Figure 4A:
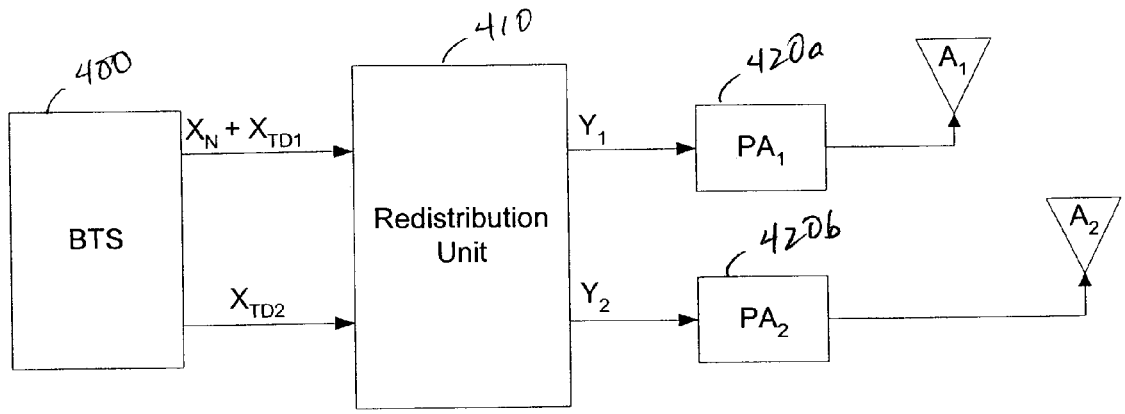
FIG. 4A is a block diagram of an apparatus that provides transmission diversity gains to a non-TD receiver.

FIG. 4A is a block diagram of an apparatus that provides transmission diversity gains to a non-TD receiver. This embodiment is coupled to a base station 400 that is configured to transmit signals directed towards the non-TD receivers on a primary antenna alone. Base station 400 outputs signal $X_N$ for transmission over a first antenna $A_1$ to non-TD receivers, and outputs signals $X_{TD1}$ and $X_{TD2}$ for transmission over the first antenna $A_1$ and a second antenna $A_2$, wherein the signals $X_{TD1}$ and $X_{TD2}$ are directed towards TD receivers. Redistribution unit 410 comprises hardware and software for processing and re-distributing the symbols over the antenna transmission paths $Y_1$ and $Y^2$. Signals on path $Y_1$ are amplified by a first power amplifier 420a before transmission on antenna $A_1$ and signals on path $Y_2$ are amplified by a second power amplifier 420b before transmission on antenna $A_2$.

Figure 4B:
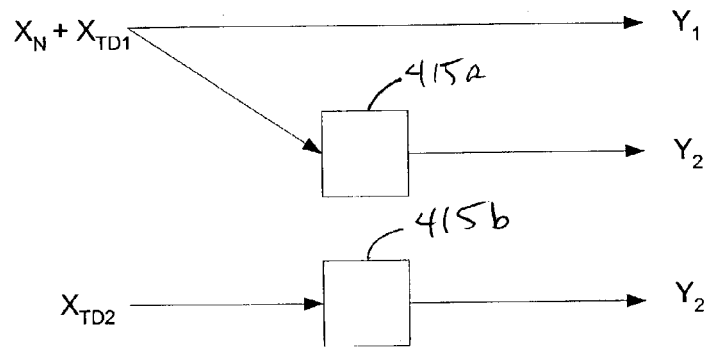
FIGS. 4B and 4C are illustrations of signal processing and redistribution within the redistribution unit of FIG. 4A
Figure 4C:
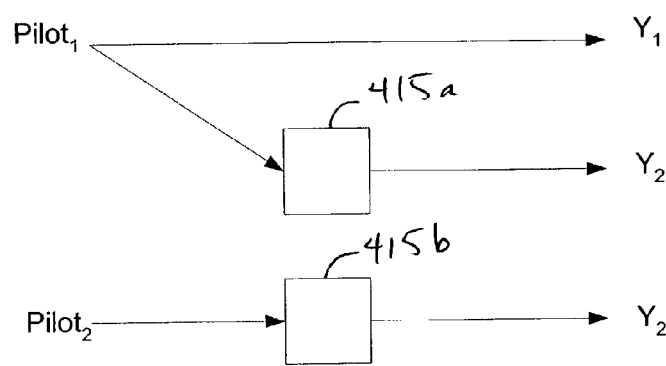

FIGS. 4B and 4C illustrates the signal processing and redistribution within the redistribution unit 410 of FIG. 4A. The redistribution unit 410 receives signals $X_N$ and $X_{TD1}$, which are originally directed for transmission over $Y_1$ (the primary antenna), and generates a time-varying version of $X_N$ and $X_{TD1}$ over path $Y_2$ using any time-varying element 415a. Hence, rather than transmitting signals $X_N$ and $X_{TD1}$ over path $Y_1$ only, the redistribution unit causes the system to transmit signals $X_N$ and $X_{TD1}$ over path $Y_1$ and time-varying versions of $X_N$ and $X_{TD1}$ over path $Y_2$.

The redistribution unit 410 further receives signal $X_{TD2}$ that is originally for transmission over path $Y_2$ (the secondary channel), and generates a time-varying version of $X_{TD2}$ using a time-varying element 415b. The time-varying version of $X_{TD2}$ is then transmitted over path $Y_2$, rather than the original signal $X_{TD2}$.

FIG. 4C illustrates the redistribution of the pilot signals on paths $Y_1$ and $Y_2$. The apparatus 410 receives a primary pilot $P_1$ and generates a time-varying version of $P_1$. The primary pilot is sent over path $Y_1$ and the time-varying version of $P_1$ is sent over path $Y_2$. The apparatus 410 further receives a second pilot $P_2$ and generates a time-varying version of $P_2$. The apparatus directs only the time-varying version of $P_2$ onto path $Y_2$.

Elements 440A, 440B, 450A, and 450B are used to represent the generation of time-varying signals. In one aspect of the embodiment, the time-varying versions are generated by multiplying the original signal with a complex sinusoid $e^{j\alpha t}$, where t is the time and $\alpha$ is a constant that determines the rate of phase change.

Figure 5A:
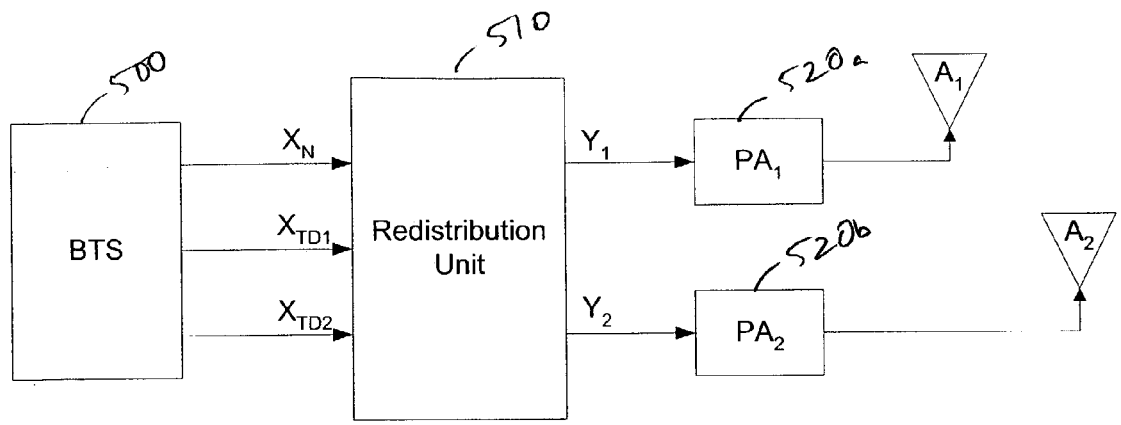
FIG. 5A is a block diagram of an apparatus that provides transmission diversity gains.

The embodiment shown in FIG. 5A is for transmission diversity systems wherein the number of antennas that are required for a transmission diversity system is based upon the number of signal types. For illustrative purposes only, the number of signal types shown in the figure is three: signals $X_N$, $X_{TD1}$ and $X_{TD2}$. One skilled in the art would understand that the apparatus could be altered to accommodate an increased number of signal types without undue experimentation. A redistribution unit 510 that configured to process, redirect, and mix input signals is coupled to a base station 500 that is configured to transmit signal $X_N$ towards non-TD receivers and signals $X_{TD1}$ and $X_{TD2}$ towards TD receivers. The redistribution unit 510 outputs signals on path $Y_1$, where the signals are amplified by a first power amplifier 520a before transmission on antenna $A_1$ and outputs signals on path $Y_2$, which are amplified by a second power amplifier 520b before transmission on antenna $A_2$.

Figure 5B:
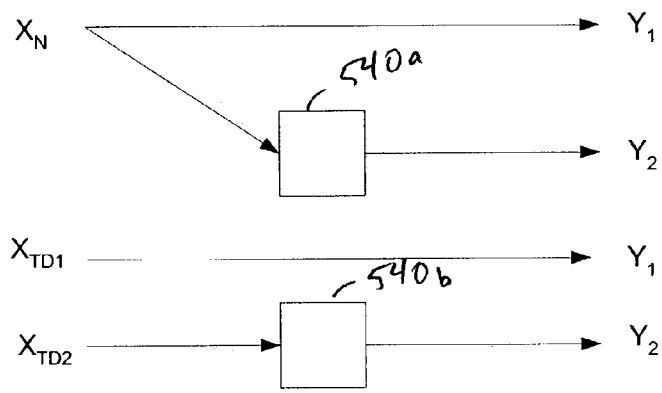
FIGS. 5B, 5C, and 5D are illustrations of signal processing and redistribution within the redistribution unit of FIG. 5A.
Figure 5C:
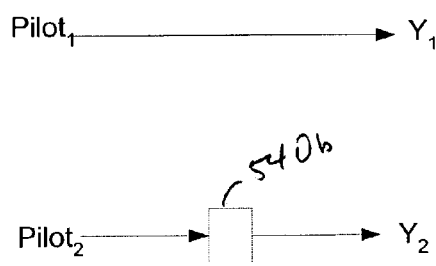
Figure 5D:
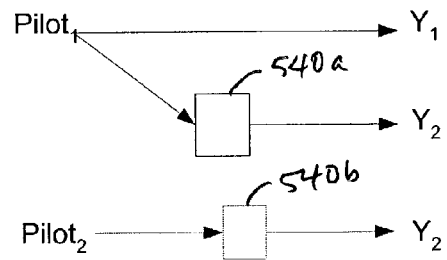

FIGS. 5B, 5C and 5D are block diagrams indicating the way input signals are processed, redirected and mixed within the redistribution unit 510 of FIG. 5A. In FIG. 5B, the redistribution unit 510 receives symbols $X_N$, $X_{TD1}$, and $X_{TD2}$, which were originally for transmission on separate antennas. The redistribution unit 510 then generates a time-varying version of $X_N$ and $X_{TD2}$ at elements 540a and 540b, respectively. The redistribution unit 510 outputs the original symbols $X_N$ and $X_{TD1}$ onto path $Y_1$ and outputs the time-varying versions of $X_N$ and $X_{TD2}$ onto path $Y_2$.

FIG. 5C illustrates the transmission of the pilot signals $P_1$ and $P_2$ on paths $Y_1$ and $Y_2$.

FIG. 5D illustrates an alternate transmission scheme for the pilot signals $P_1$ and $P_2$, wherein a time-varying transformation is performed upon the primary pilot signal $P_1$. The redistribution unit 510 outputs pilot $P_1$ onto path $Y_1$ and outputs a mixed pilot signal on path $Y_2$, wherein the mixed pilot signal comprises pilot signal $P_2$ and the time-varying version of primary pilot $P_1$.

The alternate pilot transmission scheme described in FIG. 5D requires a modification of the new TD remote stations at the factory, but not in the old, non-TD remote stations, which already operate within the system. The non-TD remote stations will merely listen for the primary pilot according to its original programming, but the TD remote stations must be configured to subtract the time-varying version of $P_1$ from the signals received over path $Y_2$. As explained previously, the time-varying version of $P_1$ on path $Y_2$ serves to provide transmission diversity gains to the non-TD remote station.

Figure 6:
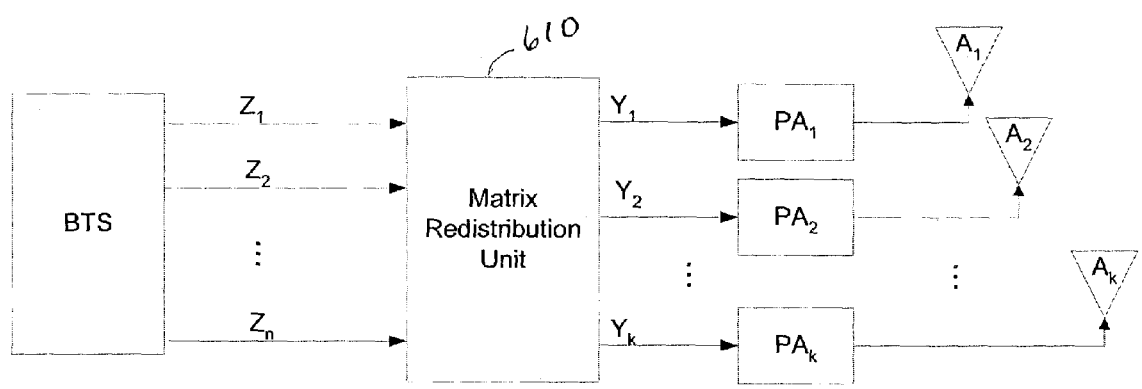
FIG. 6 is a block diagram of an apparatus that provides transmission diversity gains.

The embodiment shown in FIG. 6 is for transmission diversity wherein a plurality of signals are redistributed using a matrix transform that varies smoothly in time. Redistribution unit 610 may be represented in a mathematical form by a matrix multiplication. Let Y be a vector of transmission paths, Z be a vector of input signals, and W be a matrix of time-varying operations performed by the apparatus.

$$Y = \begin{bmatrix} Y_1 \\ \vdots \\ Y_k \end{bmatrix}, Z = \begin{bmatrix} Z_1 \\ \vdots \\ Z_n \end{bmatrix}, \text{ and } W = \begin{bmatrix} w_{11} & \cdots & w_{1n} \\ \vdots & \ddots & \vdots \\ w_{k1} & \cdots & w_{kn} \end{bmatrix}.$$

In this embodiment the matrix W varies smoothly in time, e.g. the values $w_{in}$ vary smoothly in time. Furthermore, each row of the matrix W sequentially takes the initial value of all of the other rows. The embodiment of FIG. 6 is particularly interesting because it redistributes any number of input signals to any number of antennas.

In one aspect of the embodiment of 610, the matrix W is unitary, e.g. $W \cdot W^* = I$, where $W^*$ is the conjugate transpose (also called Hermitian) of W and I is the identity matrix. The advantage of this particular embodiment is that the redistribution operation will maintain the orthogonality of the signals $Y_1$ through $Y_k$, and thereby maximize transmit diversity gains.

An interesting embodiment of redistribution unit 610 for k=2 and n=2 may be described by the following unitary matrix W:

$$W = \begin{bmatrix} \sin(\beta t) & \cos(\beta t) \\ \cos(\beta t) & -\sin(\beta t) \end{bmatrix} \begin{bmatrix} Z_1 \\ Z_2 \end{bmatrix} = \begin{bmatrix} Y_1 \\ Y_2 \end{bmatrix},$$

where $Z_1 = P_1 + X_N + X_{TD1}$ and $Z_2 = P_2 + X_{TD2}$.

This embodiment, which is referred to herein as "sin-cos", is interesting in that it can be implemented as a switching unit that does not distort the phase of the signal. The signals $Z_1$ and $Z_2$ are alternatively transmitted on $Y_1$ and $Y_2$ with smooth transitions.

Note that in all of these embodiments, although there is only one pilot signal per input, there may be one or more data signal inputs $X_N$, $X_{TD1}$ and $X_{TD2}$ since the system may be transmitting to several receivers simultaneously. For example, a cdma2000 system supporting two non-TD remote stations as well as one TD remote station may be transmitting $Z_1 = P_1 + X_{N\_user1} + X_{N\_user2} + X_{TD1\_user3}$ and $Z_2 = P_2 + X_{TD2\_user3}$, wherein $X_{N\_user1}$ is the signal for the first non-TD remote station, $X_{N\_user2}$ is the signal for the second non-TD remote station, and $X_{TD1\_user3}$ $X_{TD2\_user3}$ are the two transmit diversity signals for the third TD remote station.

The "sin-cos" embodiment may be further generalized for any even integer value n. For example, let $w_{ki}$ denote the $k^{th}$ row and $i^{th}$ column of the matrix W(t), and b(t) the time-varying function. Then matrix W(t) can be generated by setting $w_{ki} = \delta_{ki} b(t - \tau_{ki})$, wherein:

b(t)=cos($\pi$t/2) for t mod n$\leq$1 or t mod n>(n-1), and
b(t)=0 otherwise;
$\tau_{ki} = [\sigma(k-i)]$ mod n, where $\sigma$ is 1 if i is even, and
$\tau_{ki} = -1$ if i is odd; and
$\delta_{ki} = -1$ if $\tau_{ki}$ is odd and k is even, and
$\delta_{ki} = 1$ otherwise.

As the time variable t runs from 0 to n, each of the n signals $Z_i$ is applied to each of the antennas in turn with smooth variations between. For any value of t, the matrix W is a unitary transformation that scales and sums the input symbols in pairs to form the output symbols.

An alternate embodiment of redistribution unit 610 makes usage of varying the phase alone of the input signals in order to combine them together. For k=2 and n=2, this embodiment may be described by the following unitary matrix W:

$$W = \frac{1}{\sqrt{2}} \begin{bmatrix} 1 & 1 \\ e^{j\alpha t} & -e^{j\alpha t} \end{bmatrix} \begin{bmatrix} Z_1 \\ Z_2 \end{bmatrix} = \begin{bmatrix} Y_1 \\ Y_2 \end{bmatrix},$$

where $Z_1 = P_1 + X_N + X_{TD1}$ and $Z_2 = P_2 + X_{TD2}$.

This embodiment, which is referred to herein as "exp-exp", is particularly advantageous because of its inherent power controlling properties. The power emitted from each antenna is balanced, even though the original signals $Z_1$ and $Z_2$ may have different power levels.

In the "exp-exp" embodiment, the matrix W is a unitary transformation. Moreover, the matrix W loads the power over the power amplifiers $PA_1$ and $PA_2$ evenly, as follows:

$$\frac{1}{\sqrt{2}} \begin{bmatrix} 1 & 1 \\ e^{j\alpha t} & -e^{j\alpha t} \end{bmatrix} \begin{bmatrix} Z_1 \\ Z_2 \end{bmatrix} = \begin{bmatrix} \frac{1}{\sqrt{2}}(Z_1 + Z_2) \\ \frac{1}{\sqrt{2}} e^{j\alpha t}(Z_1 - Z_2) \end{bmatrix} = \begin{bmatrix} Y_1 \\ Y_2 \end{bmatrix}.$$

Hence, $$E|Y_1|^2 = \frac{1}{2}[E|Z_1|^2 + E|Z_2|^2], \text{ and}$$

$$E|Y_2|^2 = \frac{1}{2}[E|Z_1|^2 + E|Z_2|^2].$$

The power output of the two antennas are balanced, even though the original signals $P_1$, $P_2$, $Y_N$, $X_{TD1}$, and $X_{TD2}$ may have different power. In addition, the signal $X_N$ can be set to use up all the remaining power in the system, even though it is not transmitted in TD mode.

Using the signal $X_N$ to use up all the remaining power in the system can be very useful to a system such as cdma2000. In cdma2000, there are some channels that are configured for transmission over the primary antenna alone, even when transmission diversity is available. For example, in cdma2000 Revision C, the Packet Data Channel and Packet Data Control Channel are designed to use all the unused power in the system to transmit packet data. Unfortunately these two channels are only transmitted on the primary antenna if the system is configured for transmit diversity. The Packet Data Channel and Packet Data Control Channel therefore cannot utilize available power from the auxiliary antenna, which would be very desirable. Transmitting the Packet Data Channel and the Packet Data Control Channel within signal $X_N$ would improve the capacity of the system because it would provide access to the available power on the auxiliary antenna.

Hence, another consequence of the above-derived equal power property is that the system is unrestricted in utilizing the entire capacity of the power amplifiers, regardless of the relative powers of $X_N$, $X_{TD1}$ and $X_{TD2}$.

The "exp-exp" embodiment can be generalized as a type of beamforming transformation over N antennas. Let $w_{ki}$ denote the $k^{th}$ row and $i^{th}$ column of the matrix W(t). Then matrix W(t) can be generated by setting $$w_{ki} = \frac{1}{\sqrt{N}} e^{j 2\pi (i + \theta(t)) k / N}.$$

The previous embodiments assume that signals are transmitted from all antennas with equal energy. This is not a requirement. For example all of these solutions could also be embodied with a first antenna transmitting at higher power than the other antennas. A controlled amplifier or attenuator at the output of the redistribution units may easily control the power of each signal.

Furthermore the embodiments are all described in the base-band domain. It should be clear to those of skill in the art that these techniques may also be converted to be applied in the radio-frequency domain, e.g. RF domain, or in an intermediate frequency domain, e.g. IF.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A redistribution unit for processing a primary transmission signal and an auxiliary transmission signal within a transmission diversity system to provide transmission diversity gains to non-transmission diversity receivers, comprising:
   a distribution path for the primary transmission signal toward a primary antenna;
   a first time-varying element for generating a time-varying copy of the primary transmission signal and redistributing the time-varying copy of the primary transmission signal to an auxiliary antenna; and
   a second time-varying element for generating a time-varying copy of the auxiliary transmission signal and for redistributing the time-varying copy of the auxiliary transmission signal to the auxiliary antenna, wherein the auxiliary transmission signal is not distributed to the auxiliary antenna.

2. An apparatus for providing transmission diversity gains to a non-transmission diversity receiver, comprising:
   a primary antenna;
   at least one auxiliary antenna; and
   a redistribution unit configured to receive a combined non-transmit diversity and first transmit diversity signal, to receive a second transmit diversity signal, to generate a time-varying version of the combined non-transmit diversity and first transmit diversity signal, to generate a time-varying version of the second transmit diversity signal, and to redistribute the time-varying versions over the primary antenna and the at least one auxiliary antenna.

3. The apparatus of claim 2, wherein the redistribution unit performs the generation of the time-varying versions and the redistribution of the time-varying versions according to a unitary transformation.

4. The apparatus of claim 3, wherein the unitary transformation is a matrix W, such that the elements of W are $w_{ki} = \delta_{ki} b(t - \tau_{ki})$, wherein:
   $b(t) = \cos(\pi t/2)$ for t mod n $\leq$ 1 or t mod n > (n-1), and $b(t) = 0$ otherwise;
   $\tau_{ki} = [\sigma(k-i)]$ mod n, where $\sigma$ is 1 if i is even, and $\tau_{ki} = -1$ if i is odd; and
   $\delta_{ki} = -1$ if $\tau_{ki}$ is odd and k is even, and
   $\delta_{ki} = 1$ otherwise.

5. The apparatus of claim 4, wherein the matrix W is $$\begin{bmatrix} \sin(\beta t) & \cos(\beta t) \\ \cos(\beta t) & -\sin(\beta t) \end{bmatrix}.$$

6. The apparatus of claim 3, wherein the unitary transformation is a matrix $$W = \frac{1}{\sqrt{2}} \begin{bmatrix} 1 & 1 \\ e^{j\alpha t} & -e^{j\alpha t} \end{bmatrix}.$$

7. A method for providing transmission diversity gains to non-transmission diversity receivers in a transmission diversity system, wherein the transmission diversity provided using a primary antenna and an auxiliary antenna, comprising:
   generating a time-varying version of a combined non-transmit diversity and first transmit diversity signal;
   generating a time-varying version of a second transmit diversity signal;
   directing the combined non-transmit diversity and first transmit diversity signal toward the primary antenna;
   directing the time-varying version of combined non-transmit diversity and first transmit diversity signal toward the auxiliary antenna; and
   directing the time-varying version of the second transmit diversity signal toward the auxiliary antenna instead of the second transmit diversity signal.

8. Apparatus for providing transmission diversity gains to non-transmission diversity receivers in a transmission diversity system, wherein the transmission diversity provided using a primary antenna and an auxiliary antenna, comprising:
   means for generating a time-varying version of a combined non-transmit diversity and first transmit diversity signal, and for generating a time-varying version of a second transmit diversity signal; and
   means for directing the combined non-transmit diversity and first transmit diversity signal toward the primary antenna, directing the time-varying version of combined non-transmit diversity and first transmit diversity signal toward the auxiliary antenna, and directing the time-varying version of the second transmit diversity signal toward the auxiliary antenna instead of the second transmit diversity signal.

9. Apparatus for balancing the transmission power of multiple antennas in a transmission diversity system, comprising:
   a distribution path for a primary transmission signal toward a primary antenna;
   a distribution path for a first auxiliary transmission signal toward an auxiliary antenna;
   a first time-varying element for generating a time-varying copy of the primary transmission signal and redistributing the time-varying copy of the primary transmission signal towards the auxiliary antenna; and
   a second time-varying element for generating a time-varying copy of a second auxiliary transmission signal and for redistributing the time-varying copy of the second auxiliary transmission signal toward the auxiliary antenna, wherein the second auxiliary transmission signal is not distributed to the auxiliary antenna.

10. An apparatus for conveying power-balanced transmission signals of a transmission diversity system, comprising:
    a primary antenna;
    an auxiliary antenna; and
    a redistribution unit configured to receive a non-transmit diversity signal directed to the primary antenna, a first transmit diversity signal directed to the primary antenna, and a second transmit diversity signal directed to the auxiliary antenna, wherein the redistribution unit is further configured to generate a time-varying version of the non-transmit diversity signal and a time-varying version of the second transmit diversity signal and to redistribute the time-varying version of the non-transmit diversity signal to the auxiliary antenna and the time-varying version of the second transmit diversity signal to the auxiliary antenna instead of the second transmit diversity signal.

11. A method for balancing transmission loads of antennas in a transmit diversity environment, comprising:
    directing the non-transmit diversity and a first transmit diversity signal toward a primary antenna;
    generating a time-varying version of a non-transmit diversity signal;
    generating a time-varying version of a second transmit diversity signal;
    directing the time-varying version of the non-transmit diversity signal to an auxiliary antenna; and
    directing the time-varying version of the second transmit diversity signal toward the auxiliary antenna instead of the second transmit diversity signal.

12. Apparatus for balancing transmission loads of multiple antennas, comprising:
    means for directing the non-transmit diversity signal and a first transmit diversity signal toward a primary antenna;
    means for generating a time-varying version of a non-transmit diversity signal;
    means for generating a time-varying version of a second transmit diversity signal;
    means for directing the time-varying version of the non-transmit diversity signal to an auxiliary antenna; and
    means for directing the time-varying version of the second transmit diversity signal toward the auxiliary antenna instead of the second transmit diversity signal.

* * * * *